United States Patent [19]

Yoshida et al.

[11] Patent Number: 4,518,756

[45] Date of Patent: May 21, 1985

[54] BIPHENYLOXY MONO- AND DIMETHACRYLATE POLYMERIZABLE COMPOSITIONS

[75] Inventors: Haruo Yoshida; Hirotaka Tagoshi, both of Oita; Yasushi Morohashi, Saitama; Toshiaki Tanikoshi, Gunma, all of Japan

[73] Assignees: Showa Denko Kabushiki Kaisha; Showa Highpolymer Co., Ltd., both of Japan

[21] Appl. No.: 551,763

[22] Filed: Nov. 14, 1983

[30] Foreign Application Priority Data

Nov. 11, 1982 [JP] Japan .................................. 57-196739
Nov. 22, 1982 [JP] Japan .................................. 57-203732

[51] Int. Cl.³ .................... C08F 12/24; C08F 216/12
[52] U.S. Cl. ................................ 526/313; 526/329.6; 526/329.4
[58] Field of Search ......................................... 526/313

[56] References Cited

U.S. PATENT DOCUMENTS

| | | | |
|---|---|---|---|
| 3,717,689 | 2/1973 | Tanaka et al. | 526/313 |
| 3,960,981 | 6/1976 | Nargiu et al. | 526/313 |
| 4,072,657 | 2/1978 | Tanaka et al. | 526/313 |

*Primary Examiner*—Paul R. Michl
*Assistant Examiner*—Peter F. Kulkosky
*Attorney, Agent, or Firm*—Sughrue, Mion, Zinn, Macpeak, and Seas

[57] ABSTRACT

Polymerizable compositions capable of giving transparent resin having a high refractive index of at least 1.57 which are useful as optical materials and glass adhesives are disclosed. The compositions comprise a mono(meth)acrylate having a biphenyl skeleton and a di(meth)acrylate having a biphenyl skeleton or a bisphenol skeleton. The compositions cure rapidly, particularly under irradiation of ultraviolet light.

13 Claims, No Drawings

BIPHENYLOXY MONO- AND DIMETHACRYLATE POLYMERIZABLE COMPOSITIONS

FIELD OF THE INVENTION

This invention relates to polymerizable compositions capable of giving a polymer having a refractive index of at least 1.57. The compositions can be molded at high speeds with a short period of curing to form transparent resins having reduced shrinkage during molding and high refractive indices which are useful as eyeglass lenses, optical lenses and transparent adhesives for use in bonding various materials.

BACKGROUND OF THE INVENTION

Inorganic glasses have been used in many applications by taking advantage of their excellent transparency, hardness, scratch resistance, weatherability, etc. They, on the other hand, have the defect of being brittle, easily broken and heavy. Organic glasses have the advantage of light weight, safety, resistance to breakage, processability, dyeability, etc., which the inorganic glasses do not possess. Polymethyl methacrylate, polycarbonate, diethylene glycol diallyl carbonate polymer, etc., have been used as the organic glasses. Particularly, in an eyeglass application, much is expected of the organic glasses because of their light weight, safety and resistance to breakage. Polystyrene ($n_D^{20}$: about 1.59) and polycarbonate ($n_D^{20}$: about 1.59) having a high refractive index are both thermoplastic polymers and are not molded by a casting method but by other methods such as injection molding. Hence, molding shrinkage tends to occur, and furthermore, they are unsuitable for producing a small quantity each of many kinds of articles as in lenses. Moreover, since these resins have poor heat resistance and solvent resistance, their uses, particularly as eyeglass lenses, are naturally limited.

On the other hand, the diethylene glycol diallyl carbonate polymer used in the production of lenses by the casting method has the defect that it has a low refractive index ($n_D^{20}$: 1.499), and a lens made from it naturally has a larger thickness than that made from the inorganic glass. To remedy this defect, some methods for increasing the refractive index of resins have been proposed and disclosed in the prior art, for example, in Japanese Patent Application (OPI) Nos. 13747/1980, 61411/1981, 61412/1981, 2311/1982, 2312/1982, 23611/1982, 28115/1982, 28116/1982, 28117/1982 and 28118/1982 (the term "OPI" as used herein refers to a "published unexamined Japanese patent application").

According to these prior techniques, the desired cured product is obtained by injecting a uniform mixture of a monomeric composition and a polymerization initiator into casting devices and subjecting it to polymerization over a long period of time. Thus, the casting devices cannot be efficiently used by rotation, and many casting devices are required. Furthermore, an enormous amount of heat energy is required for long-term polymerization (for example, as long as 10 hours for each molding cycle), and the productivity is very low.

SUMMARY OF THE INVENTION

It is an object of this invention to provide a polymerizable composition capable of giving a resin having a refractive index of at least 1.57.

Another object of this invention is to provide a polymerizable composition capable of giving a highly refractive resin having transparency and non-coloring property desirable as eyeglass lenses or optical lenses.

Still another object of this invention is to provide a polymerizable composition capable of giving a highly refractive resin having excellent surface hardness, solvent resistance, heat resistance, dyeability and processability.

Investigations of the present inventors in an attempt to overcome the aforesaid defects have led to the discovery that a polymer having a high refractive index of at least 1.57 and excellent surface hardness, solvent resistance, heat resistance, impact strength and dyeability can be obtained within a very short period of time by copolymerizing a polymerizable composition comprising a specified mono(meth)acrylate having a biphenyl skeleton and a specified di(meth)acrylate having a biphenyl skeleton or a bisphenol skeleton.

That is, the present invention is a polymerizable composition comprising (A) a mono(meth)acrylate represented by the general formula (I):

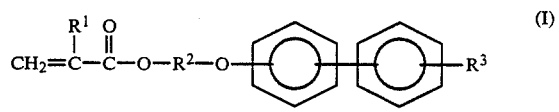

wherein $R^1$ represents a hydrogen atom or a methyl group, $R^2$ represents a divalent hydrocarbon group of 2 to 4 carbon atoms (which may be substituted with a methyl group and/or a hydroxy group), $-CH_2CH_2OCH_2CH_2-$, $-CH_2CH_2OCH_2CH_2OCH_2CH_2-$,

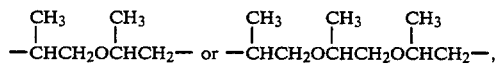

and $R^3$ represents a hydrogen atom, a chlorine atom, a bromine atom, an alkyl group (e.g., methyl), an alkoxy group (e.g., methoxy), an aryl group (e.g., phenyl) or an aryloxy group (e.g., phenoxy); and (B) a di(meth)acrylate represented by the general formula (II), (III) or (IV):

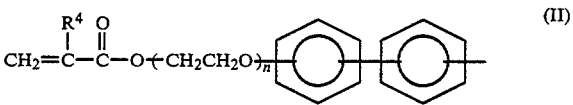

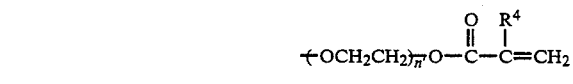

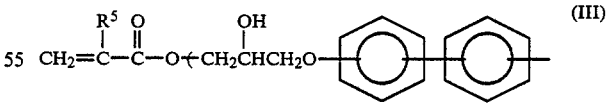

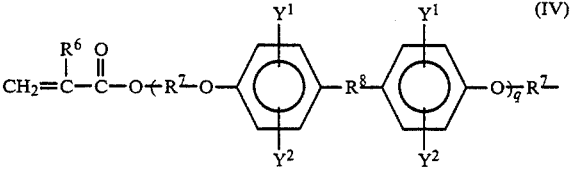

-continued

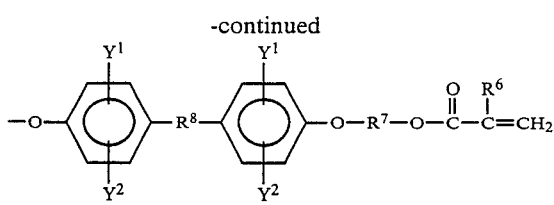

wherein $R^4$, $R^5$ and $R^6$ each represents a hydrogen atom or a methyl group, $R^7$ represents a divalent hydrocarbon group of 2 to 4 carbon atoms which may be substituted with a methyl group and/or a hydroxyl group, $R^8$ represents a divalent hydrocarbon group of 1 to 3 carbon atoms, $Y^1$ and $Y^2$ each represents a hydrogen atom, a chlorine atom or a bromine atom, n and n' each is an integer of 1 to 3, p is an integer of 1 to 4, and q is 0 or an integer of 1 to 3, provided that q is 0 when $R^7$ is a group having no hydroxy groups.

DETAILED DESCRIPTION OF THE INVENTION

Of the mono(meth)acrylate monomers (A) represented by the general formula (I), those having the [(meth)acryloyloxy]-$R^2$—O— group bonded at the ortho position of biphenyl skeleton are particularly preferred for the purpose of the present invention. The ratio of the mono(meth)acrylate monomer (A) to the di(meth)acrylate monomer (B) cannot be determined definitely because it varies depending upon the types of monomers (A) and (B) used.

One preferred embodiment (first embodiment) of the present invention is a polymerizable composition comprising (A) 3 to 80% by weight of a mono(meth)acrylate represented by the general formula (I'):

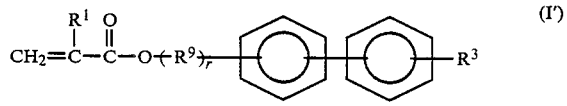

wherein $R^1$ and $R^3$ are defined above, $R^9$ represents —$CH_2CH_2O$—,

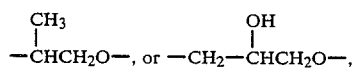

and r is an integer of 1 to 3 provided that r is 1 when $R^9$ represents

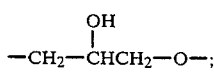

and (B) 20 to 97% by weight of a di(meth)acrylate represented by the general formula (II) or (III) or the mixture of these di(meth)acrylates.

Preferred examples of mono(meth)acrylate monomer of the formula (I') include those having —$CH_2CH_2O$— or

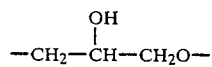

for $R^9$. Further, r is preferably 1 since such mono(meth)acrylate monomers have low viscosity and can easily be handled. Preferred examples of di(meth)acrylate monomers of the formula (II) include those having both n and n' of 1, those having n and n' of 1 and 2, respectively, and the mixtures thereof, which provide resins having high impact strength and excellent weatherability. Preferred examples of di(meth)acrylate monomer of the formula (III) include those having p of 1 which provide resins having high refractive indices. Further, a mixture of those having p's of 1, 2 and 3 is preferably used for the monomers of the formula (III) since the mixture has good compatibility with mono(meth)acrylate monomers of the formula (I').

In this embodiment, the mono(meth)acrylate monomer of the general formula (I') is preferably used in an amount of 3 to 80% by weight, more preferably 5 to 75% by weight. Two or more kinds of mono(meth)acrylate monomers of the formula (I') may be used in combination. If the amount of the monomer of the formula (I') is less than 3% by weight, the resulting polymer has much increased surface hardness, but suffers from a deterioration in impact strength and processability. On the other hand, when the amount exceeds 80% by weight, the surface hardness, solvent resistance and processability of the resulting polymer are insufficient.

In combination with the mono(meth)acrylate monomer of the general formula (I'), the di(meth)acrylate monomers of the general formulae (II) and (III) may be used either singly or as a mixture in an arbitrary ratio. The amount of the monomer of the formula (II) and/or (III) cannot be determined definitely because it differs depending upon the type and amount of the mono(meth)acrylate monomer of the formula (I') to be copolymerized therewith, and the type of the di(meth)acrylate monomer of the formula (II) and/or (III), but it is preferably 20 to 97% by weight, more preferably 25 to 95% by weight, based on the entire amount of the mono- and di-(meth)acrylate monomers.

Two or more different kinds of di(meth)acrylate monomers of the general formula (II), or of di(meth)acrylate monomers of the general formula (III) may be used in combination.

A polymer having a high refractive index of at least 1.58, preferably 1.58 to 1.61, more preferably 1.59 to 1.61, can be obtained by the copolymerization of the polymerizable composition comprising of the monomer of the formula (I') and the monomer of the formula (II), or the monomer of the formula (III), or a mixture of the monomers of the formulae (II) and (III). To improve operability during the polymer production, impact strength and dyeability, another polymerizable monomer may also be copolymerized with the aforesaid monomers. Examples of such polymerizable monomers include diethylene glycol diacrylate, trimethylolpropane triacrylate, pentaerythritol triacrylate, diallylidene pentaerythritol diacrylate, diallylidene pentaerythritol dimethacrylate, methyl methacrylate and butyl methacrylate. Of the monomers, trimethylolpropane triacrylate and diallylidene pentaerythritol diacrylate are preferably used. The amount of the monomer is determined by considering the purpose of use, the mixing ratio of the polymerizable composition, etc., and is at most about 10% by weight, preferably 3 to 10% by weight, based on the above polymerizable composition.

Another preferred embodiment (second embodiment) of the present invention is a polymerizable composition comprising (A) 30 to 95% by weight of a mono(meth)acrylate represented by the general formula (I")

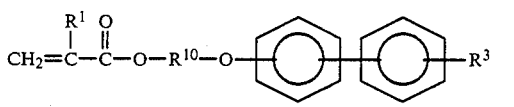

(I″)

wherein R¹ and R³ are defined above, and R¹⁰ represents a divalent hydrocarbon group of 2 to 4 carbon atoms which may be substituted with a methyl group and/or a hydroxy group; and (B) 5 to 70% by weight of a di(meth)acrylate represented by the general formula (IV).

Preferred examples of mono(meth)acrylate monomer of the formula (I″) include 2-(2-acryloyloxyethoxy)-biphenyl, 2-[2-(meth)acryloyloxyethoxy]biphenyl, 2-[3-(meth)acryloyloxy-2-hydroxypropoxy]biphenyl, 2-(3-acryloyloxy-2-hydroxypropoxy)-2′-chlorobiphenyl, 2-(2-acryloyloxyethoxy)-2′-phenoxybiphenyl and 2-(3-acryloyloxy-2-hydroxy-2-methylpropoxy)biphenyl. Of these, the first four monomers are preferred. Preferred examples of di(meth)acrylate monomer of the formula (IV) include those having q of 1 and a mixture of those having q's of 1, 2 and 3, which have good compatibility with mono(meth)acrylate monomers of the formula (I″).

The amount of the mono(meth)acrylate monomer of the formula (I″) is preferably 30 to 95% by weight, more preferably 40 to 90% by weight. If the amount of the monomer is less than 30% by weight, the surface hardness of the resulting polymer is increased markedly, but its impact strength and processability are deteriorated undesirably. On the other hand, when the amount exceeds 95% by weight, the resulting polymer has insufficient surface hardness, solvent resistance and processability.

The amount of the di(meth)acrylate monomer of the formula (IV) used in the second embodiment of this invention cannot be determined definitely because it varies depending upon the type and amount of the mono(meth)acrylate monomer of the formula (I″), but it is preferably 5 to 70% by weight, more preferably 10 to 60% by weight.

A resin having a high refractive index of at least 1.57, preferably 1.57 to 1.60, more preferably 1.58 to 1.60, can easily be obtained by copolymerizing at least one mono(meth)acrylate monomer of the formula (I″) and at least one di(meth)acrylate monomer of the formula (IV). If desired, in order to improve impact strength, dyeability, weatherability, etc., further, another polymerizable monomer may be copolymerized as in the first embodiment described above.

Polymerization of the compositions in accordance with this invention in both of the above embodiments can be carried out by a radical polymerization technique. The polymerization may be effected under heat or under irradiation of activated energy rays such as ultraviolet light and γ-rays. By using any of these polymerization methods, polymers having high refractive indices and being free from optical distortion can be obtained within short periods of time. Polymerization under ultraviolet light can be completed in a particularly short period of time, and has the advantage of greatly increasing productivity. Hence, it is especially preferred in this invention.

When the polymerization is to be performed under heat, an ordinary radical polymerization initiator such as benzoyl peroxide, diisopropyl peroxydicarbonate and azobisisobutyronitrile may be used. When the polymerization is to be carried out under irradiation of ultraviolet light, there can be used generally known photosensitizers such as benzoin, benzoin methyl ether, benzoin ethyl ether, benzoin isopropyl ether, benzoin isobutyl ether, 2-benzoyl-2-hydroxypropane, azobisisobutyronitrile, benzil and thioxanthone. The amount of the radical polymerization initiator or the photosensitizer used is at most 5% by weight based on the polymerizable composition.

When ionizing radiations such as γ-ray radiation are used, it is generally not necessary to add a polymerization accelerator.

If desired, a yellowing-preventing agent (e.g., triphenyl phosphine), a levelling agent (e.g., a fluorine-containing surface active agent), and an ultraviolet absorber (e.g., 2-(2-hydroxy-5-methylphenyl)-2H-benzotriazole) may be added in the polymerizable compositions of the invention in amounts which do not impede polymerization and curing.

The refractive indices of a polymer obtained from the polymerizable compositions of this invention vary depending upon the kinds and proportions of the starting monomers, but are at least 1.57 which is higher than the refractive indices of general transparent thermosetting resins (urea resin 1.54; melamine resin 1.55; alkyd resins 1.55; diallyl phthalate resins 1.56; diethylene glycol diallyl carbonate resin 1.50).

Since resins obtained from the polymerizable compositions of this invention have a high refractive index and excellent surface hardness and other properties, they can be used not only as eyeglass lenses but also as camera lenses, sealing agents for light-emitting diodes, glass adhesives, and binders for luminous beads.

The following examples illustrate the present invention more specifically, but the present invention is not limited to these examples. The various properties of the molded articles obtained in these examples were measured by the following methods.

(1) Refractive Index

The refractive index of a sample at 20° C. was measured by an Abbe refractometer. Bromonaphthalene was used as a contacting liquid.

(2) Hardness

Measured by a Rockwell hardness tester in Examples 1 to 11, and by a Barcol hardness tester in Examples 12 to 15.

(3) Surface Condition

The condition of both surfaces of a molded article sample was visually observed and evaluated. If the sample is smooth at both surfaces, it was evaluated as "good".

(4) Light Transmittance

Measured by using a haze meter (made by Suga Testing Instrument Co., Ltd.).

(5) Impact Strength Test

In accordance with FDA standards, a steel ball (15.9 mm in diameter and 16.2 g in weight) was let fall onto a sample from a height of 127 cm. If the sample was not broken in this test, its impact strength was evaluated as "good".

(6) Heat Resistance

A sample was left to stand for 3 hours in a hot air dryer at 120° C., and then it was visually observed. If the sample was free of coloration and surface distortion, its heat resistance was evaluated as "good".

(7) Dyeability

A molded article sample was immersed in a 0.2% aqueous solution of Disperse Brown 3 at 92° C. for 10 minutes, then withdrawn and well washed with water and dried. When no dyeing unevenness was observed in the dyed sample, its dyeability was evaluated as "good".

EXAMPLE 1

Seventy-five (75) parts by weight 2-(2-acryloyloxyethoxy)biphenyl, 25 parts by weight of 2,2'-bis(2-acryloyloxyethoxy)biphenyl, 0.5 part by weight of 2-benzoyl-2-hydroxypropane, 0.1 part by weight of triphenyl phosphine as a yellowing-preventing agent, and 0.2 part by weight of 2-(2-hydroxy-5-methylphenyl)-2H-benzotriazole as an ultraviolet absorber were mixed to form a uniform composition. The composition was injected into a casting mold for an eyeglass lens, and after defoaming, subjected to irradiation at both surfaces for 4 seconds by means of a 2 kw high-pressure mercury lamp at an irradiation distance of 10 cm.

The mold was then removed, and the product was heat-treated at 100° C. for 1 hour in an oven to give a colorless clear eyeglass lens free from an optical distortion.

The properties of the resulting eyeglass lens were determined, and the results are shown in Table 1.

EXAMPLES 2 TO 9

The polymerizable monomers of the general formulae (I'), (II) and (III) shown in Table 1 were mixed in the proportions indicated, and eyeglass lenses were produced under the same conditions as in Example 1. The properties of the resulting lenses are shown in Table 1.

Impact strength: good
Heat resistance: good
Dyeability: good

EXAMPLE 11

Seven parts by weight of 2-(2-methyl-2-acryloxyloxyethoxy)biphenyl, 93 parts by weight of 2,2'-bis(2-acryloyloxyethoxy)biphenyl, 0.3 part by weight of azobisisobutyronitrile as a photosensitizer, 0.1 part by weight of 2-benzoyl-2-hydroxypropane, and 0.1 part by weight of triphenyl antimony as a yellowing-preventing agent were mixed and well stirred at 60° C. to dissolve them uniformly. The uniform solution was injected into a glass mold for sealing of a light-emitting diode, and a GaP diode element connected to a substrate by lead wires was immersed therein, and ultraviolet light was irradiated from the surrounding of the mold using a 2 kw high-pressure mercury lamp. The solution completely cured in 10 seconds to provide a transparent seal having a refractive index of 1.591.

EXAMPLE 12

Seventy-five (75) parts by weight of 2-(2-acryloyloxyethoxy)biphenyl, 25 parts by weight of epoxy acrylate (obtained by reacting 2 moles of acrylic acid with 1 mole of an epoxy resin having an epoxy equivalent of 190 resulting from the condensation of bisphenol A with epichlorohydrin, under heat in the presence of a lithium chloride catalyst), 0.5 part by weight of 2-benzoyl-2-hydroxypropane and 0.1 part by weight of triphenyl phosphine as a yellowing-preventing agent were mixed to form a uniform transparent composition. The composition was injected into a casting mold built up of

TABLE 1

| Example | Proportions of the Polymerizable Monomers (I')/(II)/(III) (wt %) | Properties | | | | | | |
|---|---|---|---|---|---|---|---|---|
| | | Refractive Index | Hardness | Surface Condition | Light Transmittance | Impact Strength | Heat Resistance | Dyeability |
| 1 | 75/25/0 | 1.606 | 115 | good | 91 | good | good | good |
| 2 | 60/40/0 | 1.604 | 117 | " | 91 | " | " | " |
| 3 | 40/60/0 | 1.600 | 121 | " | 89 | " | " | " |
| 4 | 75/0/25 | 1.609 | 116 | " | 90 | " | " | " |
| 5 | 60/0/40 | 1.608 | 117 | " | 90 | " | " | " |
| 6 | 40/0/60 | 1.607 | 122 | " | 90 | " | " | " |
| 7 | 75/10/15 | 1.608 | 117 | " | 91 | " | " | " |
| 8 | 60/20/20 | 1.606 | 119 | " | 90 | " | " | " |
| 9 | 40/20/40 | 1.605 | 123 | " | 90 | " | " | " |

(I'): 2-(2-acryloyloxyethoxy)biphenyl
(II): 2,2'-bis(2-acryloyloxyethoxy)biphenyl
(III): an adduct of acrylic acid and an epoxy resin having an epoxy equivalent of 160 obtained by the condensation of 2,2'-dihydroxydiphenyl and epichlorohydrin

EXAMPLE 10

Thirty (30) parts by weight of 2-(3-acryloyloxy-2-hydroxypropoxy)biphenyl, 70 parts by weight of 2,2'-bis(2-acryloyloxyethoxy)biphenyl, 2 parts by weight of benzoyl peroxide, and 0.2 part by weight of 2-(2-hydroxy-5-methylphenyl)-2H-benzotriazole were mixed to form a uniform composition. The composition was injected into a casting mold for an eyeglass lens, and after defoaming, copolymerized and cured at 100° C. for 2 hours in a heating furnace. On removal of the mold, a colorless transparent lens free from an optical distortion was obtained. The properties of the resulting lens were as shown below.
Refractive index: 1.598
Hardness: 123
Surface condition: good
Light transmittance: 91 a lens-molding glass mold having a diameter of 76 mm and a resinous gasket, and after sealing, the composition was irradiated at both surfaces for 4 seconds each at an irradiation distance of 10 cm by means of a 2 kw high-pressure mercury lamp having a lamp input of 80 w/cm.

Then, the gasket and the lens-molding glass mold were removed, and the product was heat-treated in an oven at 100° C. for 1 hour to form a colorless transparent lens. The properties of the resulting eyeglass lens are shown in Table 2.

EXAMPLE 13

Example 12 was repeated except that the amounts of the 2-(2-acryloyloxyethoxy)biphenyl and epoxy acrylate were changed to 60 parts by weight and 40 parts by weight, respectively. Both surfaces of the composition were irradiated each for 3.2 seconds and heat-treated to form a colorless transparent lens. The properties of the resulting eyeglass lens are shown in Table 2.

EXAMPLE 14

Example 12 was repeated except that 40 parts by weight of 2-(2-acryloyloxyethoxy)biphenyl and 60 parts by weight of 2,2-bis[4-(ω-acryloyloxydiethoxy)phenyl]propane were used as the monomers of formulae (I″) and (IV). The composition was irradiated at both surfaces for 4 seconds each to give a colorless transparent lens.

The properties of the resulting eyeglass lens are shown in Table 2.

COMPARATIVE EXAMPLE 1

Forty (40) parts by weight of phenylvinyl sulfoxide, 60 parts by weight of 2,2-bis[4-(2-acryloyloxyethoxy)phenyl]propane and 1 part by weight of 2-benzoyl-2-hydroxypropane were subjected to copolymerization using the same irradiation device as used in Example 12. The composition, however, did not cure even after irradiation for 72 seconds.

COMPARATIVE EXAMPLE 2

Example 12 was repeated except that diethylene glycol bisallyl carbonate ("CR-39", trademark, produced by P.P.G. Ind. Inc.) generally used as a monomer for production of eyeglass lenses was used instead of the monomers used in Example 12. Ultraviolet light was irradiated under the same conditions as in Example 12, but even after irradiation for 10 minutes, only a soft gel was obtained and a cured product capable of being used as a lens could not be obtained.

in 4 hours to give a transparent flat plate. The plate had the following properties.

Refractive index: 1.580
Color: colorless
Hardness: BS 85, BH 40
Impact strength: good
Surface condition: good
Light transmittance: 90
Heat resistance: good
Dyeability: good This test piece was free from an optical distortion.

It will be seen from the foregoing Examples that resins obtained by using the polymerizable compositions of this invention have a high refractive index and can be conveniently used in various applications.

While the invention has been described in detail and with reference to specific embodiments thereof, it will be apparent to one skilled in the art that various changes and modifications can be made therein without departing from the spirit and scope thereof.

What is claimed is:

1. A polymerizable composition capable upon polymerization of production of a polymer having a refractive index of at least 1.57 comprising (A) a mono(meth)acrylate represented by general formula (I):

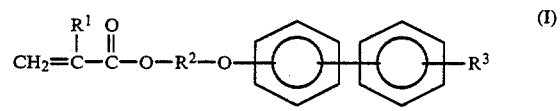

wherein $R^1$ represents a hydrogen atom or a methyl group, $R^2$ represents a divalent hydrocarbon group of 2

TABLE 2

| Example | Monomer Proportions* (parts by weight) | Refractive Index | Color | Hardness | Impact Strength | Surface Condition | Light Transmittance | Heat Resistance | Dyeability |
|---|---|---|---|---|---|---|---|---|---|
| 12 | BPEA/BPAPA (75/25) | 1.600 | colorless | BS 85 BH 30 | good | good | 90 | good | good |
| 13 | BPEA/BPAPA (60/40) | 1.596 | ″ | BS 85 BH 30 | ″ | ″ | 89 | ″ | ″ |
| 14 | BPEA/BPAEA (40/60) | 1.587 | ″ | BS 85 BH 35 | ″ | ″ | 90 | ″ | ″ |
| Comp. Ex. 1 | PVS/BPAEA (40/60) | Could not be measured because the composition did not cure. | — | — | — | — | — | — | — |
| Comp. Ex. 2 | CR-39 (100) | Could not be measured because the curing of the composition was insufficient. | — | — | — | — | — | — | — |

*The abbreviations of the monomers have the following meanings: BPEA: 2-(2-acryloyloxyethoxy)biphenyl, BPAPA: an adduct obtained by the reaction of acrylic acid with an epoxy resin obtained by the condensation of bisphenol A and epichlorohydrin, BPAEA: 2,2-bis[4-(2-acryloyloxyethoxy)phenyl]propane, PVS: phenylvinyl sulfoxide, CR-39: diethylene glycol diallyl carbonate

EXAMPLE 15

Fifty (50) parts by weight of 2-(2-methyl-2-acryloyloxyethoxy)biphenyl, 50 parts by weight of epoxy acrylate (obtained by reacting 1 mole of an epoxy resin having an epoxy equivalent of 210 with 2 moles of acrylic acid at 120° C. in the presence of diethylamine hydrochloride as a catalyst), and 0.2 part by weight of benzoyl peroxide as a heat polymerization catalyst were mixed, and well stirred at 40° C. to form a uniform solution. The solution was cast into a mold for test piece preparation (2 mm × 15 mm × 100 mm), and put into a hot air furnace at 90° C. The solution cured completely to 4 carbon atoms which may be substituted with a methyl group and/or a hydroxyl group, —CH$_2$CH$_2$OCH$_2$CH$_2$—, —CH$_2$CH$_2$OCH$_2$CH$_2$OCH$_2$CH$_2$—,

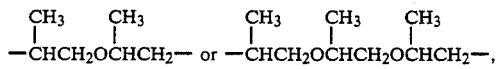

and $R^3$ and $R^3$ represents a hydrogen atom, a chlorine atom, a bromine atom, an alkyl group, an alkoxy group, an aryl group or an aryloxy group; and (B) a di(meth)a- crylate represented by the general formula (II), (III) or (IV):

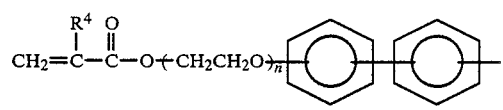

(II)

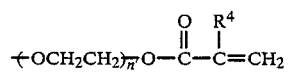

(III)

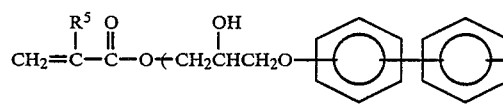

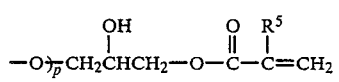

(IV)

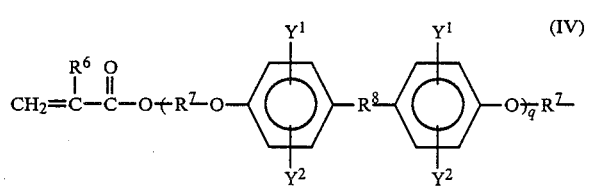

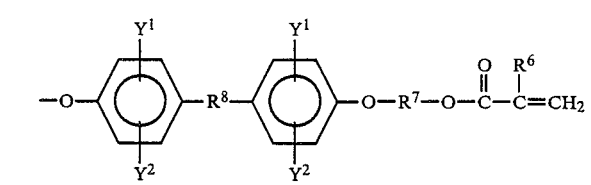

wherein $R^4$, $R^5$ and $R^6$ each represents a hydrogen atom or a methyl group, $R^7$ represents a divalent hydrocarbon group of 2 to 4 carbon atoms which may be substituted with a methyl group and/or a hydroxy group, $R^8$ represents a divalent hydrocarbon group of 1 to 3 carbon atoms, $Y^1$ and $Y^2$ each represents a hydrogen atom, a chlorine atom or a bromine atom, n and n' each is an integer of 1 to 3, p is an integer of 1 to 4, and q is 0 or an integer of 1 to 3, provided that q is 0 when $R^7$ is a group having no hydroxy groups and wherein the ratio of (A) to (B) is from 3:7 to 3:1.

2. A polymerizable composition as claimed in claim 1, wherein the mono(meth)acrylate has the (meth)acryloyloxy-$R^2$—O— group bonded at the ortho position of biphenyl skeleton.

3. A polymerizable composition as claimed in claim 1, wherein the composition comprises (A) a mono(meth)acrylate represented by the general formula (I'):

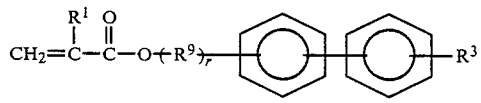

(I')

wherein $R^1$ represents a hydrogen atom or a methyl group, $R^3$ represents a hydrogen atom, a chlorine atom, a bromine atom, a methyl group, a methoxy group, a phenyl group or a phenoxy group, $R^9$ represents —CH$_2$CH$_2$O—,

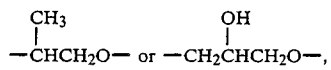

and r is an integer of 1 to 3 provided that r is 1 when $R^9$ represents

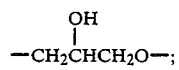

and (B) a di(meth)acrylate represented by the general formula (II) or (III) or a mixture thereof.

4. A polymerizable composition as claimed in claim 1, wherein the composition comprises (A) a mono(meth)acrylate represented by the general formula (I''):

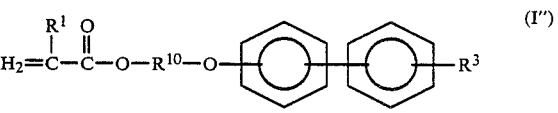

(I'')

wherein $R^1$ represents a hydrogen atom or a methyl group, $R^3$ represents a hydrogen atom, a chlorine atom, a bromine atom, a methyl group, a methoxy group, a phenyl group or a phenoxy group, and $R^{10}$ represents a divalent hydrocarbon group of 2 to 4 carbon atoms which may be substituted with a methyl group and/or a hydroxy group; and (B) a di(meth)acrylate represented by the general formula (IV).

5. A polymerizable composition as claimed in claim 3, wherein the mono(meth)acrylate has the (meth)acryloyloxy($R^9$)$_r$ group bonded at the ortho position of biphenyl skeleton.

6. A polymerizable composition as claimed in claim 4, wherein the mono(meth)acrylate has the (meth)acryloyloxy-$R^{10}$—O— group bonded at the ortho position of biphenyl skeleton.

7. A polymerizable composition as claimed in claim 4, wherein the amount of component A is 40% by weight or more based on the total weight of components A and B.

8. A resin obtained by polymerizing the polymerizable composition of claim 1.

9. A resin as claimed in claim 8, wherein the polymerizable composition is that of claim 2.

10. A resin as claimed in claim 8, wherein the polymerizable composition is that of claim 3.

11. A resin as claimed in claim 8, wherein the polymerizable composition is that of claim 4.

12. A polymerizable composition as claimed in claim 1, wherein $R^2$ is $C_2H_4$.

13. A polymerizable composition as claimed in claim 2, wherein $R^2$ is $C_2H_4$.

* * * * *